No. 815,616. PATENTED MAR. 20, 1906.
H. J. MILLER.
SULKY.
APPLICATION FILED JULY 3, 1905.
3 SHEETS—SHEET 1.
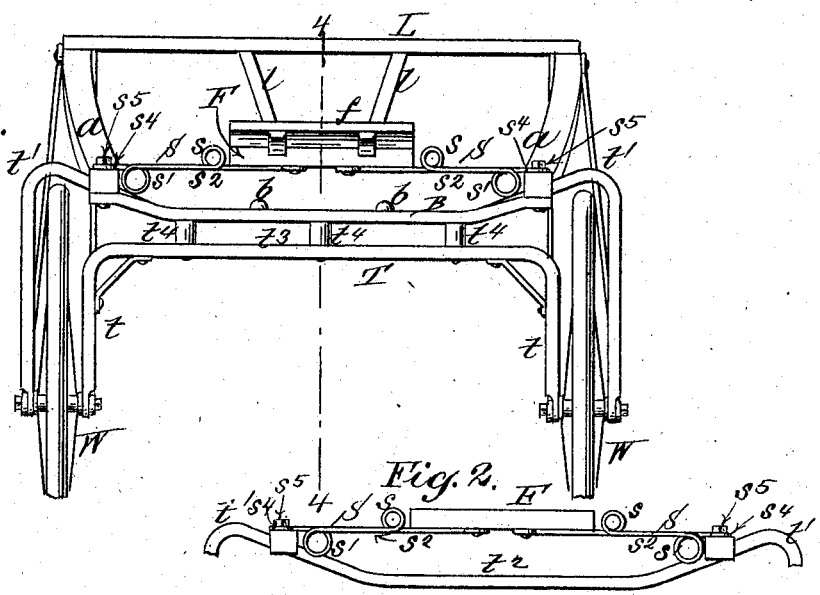
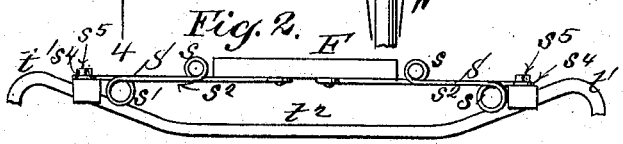
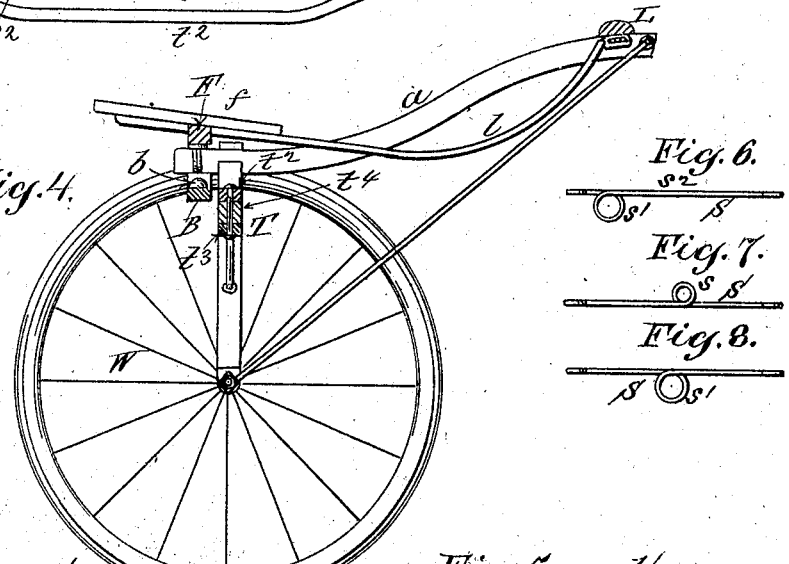
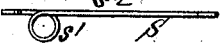
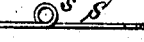
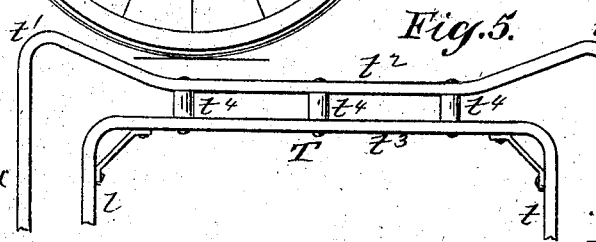

No. 815,616. PATENTED MAR. 20, 1906.
H. J. MILLER.
SULKY.
APPLICATION FILED JULY 3, 1905.
3 SHEETS—SHEET 2.
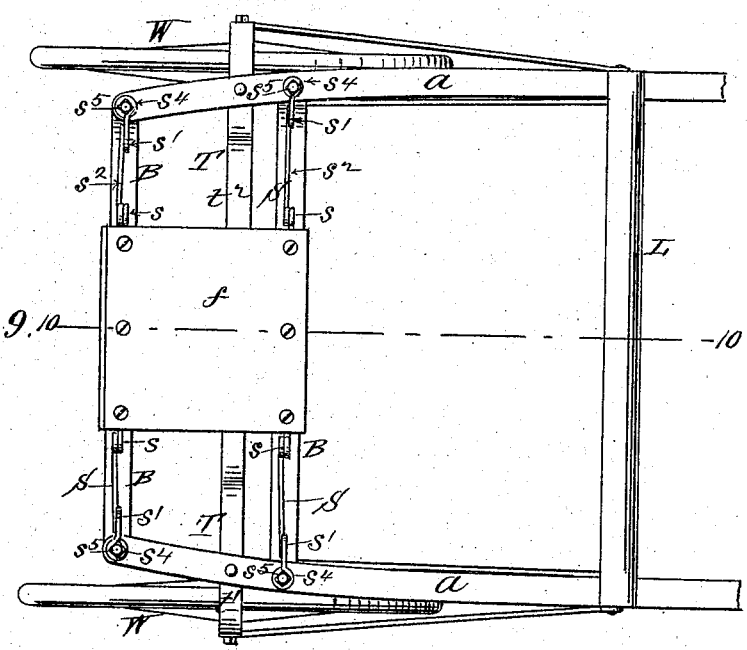
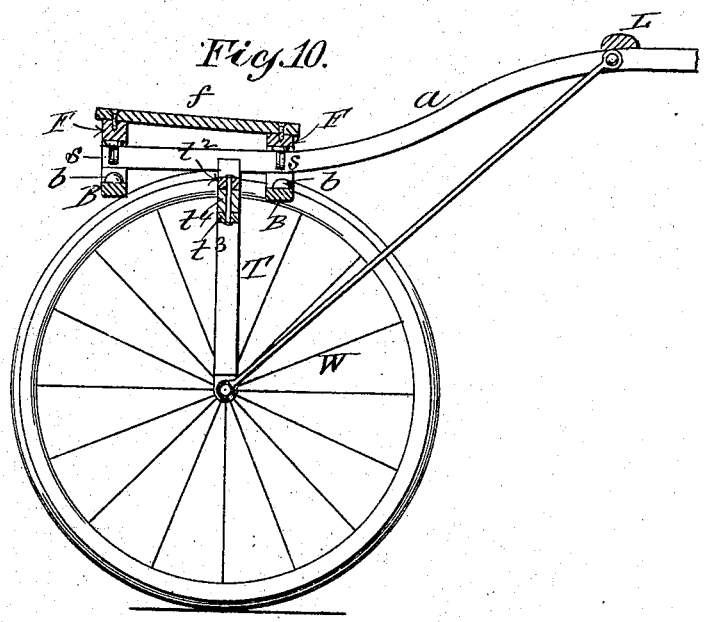

No. 815,616. PATENTED MAR. 20, 1906.
H. J. MILLER.
SULKY.
APPLICATION FILED JULY 3, 1905.

3 SHEETS—SHEET 3.

Witnesses:
R. W. Gardner.
A. Delos Kneeland.

Inventor:
Henry J. Miller
By his Attorney
Geo. Wm. Miatt

UNITED STATES PATENT OFFICE.

HENRY J. MILLER, OF GOSHEN, NEW YORK.

SULKY.

No. 815,616.     Specification of Letters Patent.     Patented March 20, 1906.

Application filed July 3, 1905. Serial No. 268,042.

*To all whom it may concern:*

Be it known that I, HENRY J. MILLER, a citizen of the United States, residing at Goshen, Orange county, and State of New York, have invented certain new and useful Improvements in Sulkies and Similar Vehicles, of which the following is a specification.

While my present improvements are applicable to vehicles generally, they are especially designed with reference to the class of light-weight vehicles known as "sulkies," "road-carts," and the like, usually to be drawn by a single horse, and to accommodate only one person—the driver.

The invention is designed to simplify and cheapen the structure of such vehicles, to attain a maximum degree of strength and rigidity combined with lightness of form and weight, to afford a resilient mount or support for the driver's seat which will effectually overcome the objections inherent and unavoidable where the seat is attached to a leaf-spring, as is customary at the present time, to render the seat lower and more accessible, to attain the minimum of frictional resistance, vibration, and noise during the operation of the parts, and to attain other practical advantages hereinafter stated.

The invention consists in the combination and arrangement of parts hereinafter described and claimed specifically.

Figure 11:
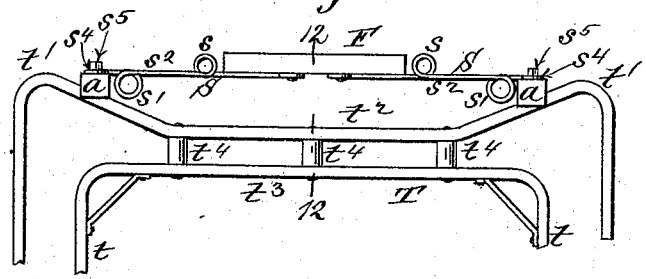
Figure 12:
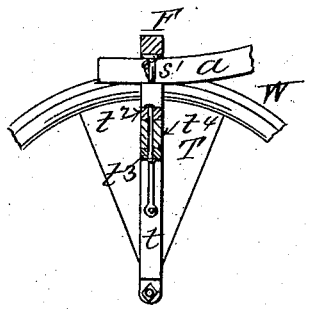
Figure 13:
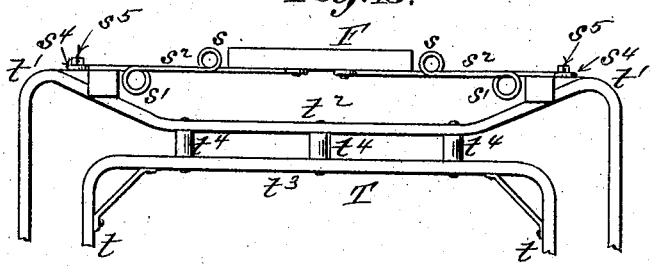
Figure 14:
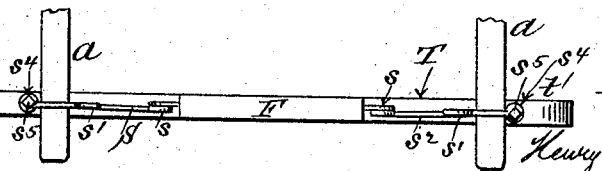

In the accompanying drawings, Figure 1 is a rear elevation of a sulky provided with my improvements, the lower portions of the wheels being broken away. Fig. 2 is a view of the suspender-springs and connections as related to the depressed truss-bar; Fig. 3, a like view showing the floating seat-bar depressed. Fig. 4 is a central vertical section upon plane of line 4 4, Fig. 1. Fig. 5 is an elevation of the upper portion of the wheel-truss. Figs. 6, 7, and 8 are views showing modifications of springs. Fig. 9 is a top view of a modification of structure. Fig. 10 is a central vertical section upon plane of line 10 10, Fig. 9. Fig. 11 is a rear view of the upper portion of the truss, showing the springs attached indirectly thereto through the thills where the latter join the truss. Fig. 12 is a transverse section upon plane of line 12 12, Fig. 11. Fig. 13 is a view similar to Fig. 11, showing the springs attached directly to the truss. Fig. 14 is a top view of the parts shown in Fig. 13.

In vehicles of this class the less the distance of the seat above the axial line of the wheels the less will be the lateral motion or sway of the seat or driver thereon, and hence the less "interference" with the motion of the vehicle and the movements of the horse, as is well known from practical observation and experience, and the less the "wind resistance" encountered by the driver, since it is obvious that at the axial line between the wheels there would be little or no "top heaviness" or liability to lateral vibration, while the lower the position of the driver the more his body will be shielded by that of the horse. Hence the peculiar construction of my wheel-truss T, which consists of the lower bridge-bar $t$, connected at either extremity directly with the axles of the wheels W W, and the upper bridge-bar $t'$, also connected with the axles of the wheels W W and straddling the latter, the horizontal portion $t^2$ of the upper bridge-bar $t'$ being depressed into proximity to the horizontal member $t^3$ of the lower bridge-bar $t$, as clearly shown in Fig. 5, said parallel portions $t^2$ $t^3$ of the truss being coupled together by spacing-stays $t^4$ $t^4$, which stiffen and unite the parts into one integral structure.

I am aware that in my concurrent application, Serial No. 256,234, filed April 18, 1905, I show, (see Fig. 14,) but do not claim, a somewhat similar structure, but that is incidental only and differs from the present structure in that the lower bridge-bar is therein attached to the thills, whereas in this case the lower bridge-bar is attached directly to the axles of the wheels. The essential feature in this respect, however, and which I seek to claim herein is the depression of the horizontal portion of the upper bridge-bar below its upright or vertical portions and incidentally, as shown in the present case, below or within the rims or peripheries of the wheels W W. This construction enables me to so mount and support the floating seat-bar F that when the seat $f$ is depressed out of its normal position by weight or jar the said floating seat-bar will descend into this central depression in the truss. In other words, by thus providing for the play or motion of the floating seat-bar between the higher portions of the upper bridge-bar $t'$ of the truss am practically enabled to lower the normal position of the seat to an extent equal to the depth of the depression of the horizontal portion $t^2$ of the said upper bridge-bar, thereby materially reducing the distance between the seat and the axial line of the wheels and insuring the advantages hereinbefore indicated.

The floating seat-bar F is mounted upon suspender-springs S S, the outer extremities of which are secured to the thills $a$ $a$. These suspender-springs S S are preterably made of steel wire with one or more loops or convolutions $s$ $s'$, the planes of which are substantially in line with or parallel to the lengths of the spring. Figs. 6, 7, and 8 show modifications having single loops or coils, and obviously each spring may be formed with any suitable or desired number of such loops, and I do not limit myself in this respect, since practical results may be attained by various modifications of the spring in this respect. I prefer, however, to form each spring S with two resilient loops $s$ $s'$, arranged on opposite sides of the main body of wire $s^2$ and near either extremity thereof, as shown in the main figures of the drawings, in which arrangement the loops $s$ and $s'$ may be said, in a sense, to work against each other, although in unison, the smaller loop $s$, which may be formed with two or more convolutions, yielding, primarily, to the weight upon the seat, while the larger loop $s'$ not only yields to such weight, but tends constantly to restore the intermediate portion $s^2$ and smaller loop $s$ and the floating seat-bar F to their normal positions.

The springs S may be secured to the thills and to the seat by any expedient, as by forming eyes $s^4$ at each end of the spring for engagement with retaining-screws $s^5$ or equivalent means of attachment. The loops $s$ $s'$ are preferably arranged in proximity to the ends of the springs, so as to relieve the fastenings as much as possible and the shanks of the springs, especially at the edges of the thills and seat-bar, from undue lateral strain or leverage during the depression of the seat. This will be understood by reference to Figs. 2 and 3, by a comparison of which it will also be seen that the depressed upper truss-bar affords ample scope for the vertical play of the seat and floating seat-bar F.

On Sheet 1 of the drawings the seat $f$ is shown as supported upon a single floating bar F, whereas on Sheet 2 it is shown as supported upon two such floating bars, the suspender-springs of which are secured to the thills, as hereinbefore described, the main difference being that in the latter form the rods $l$ $l$ for connecting the seat with the trace-bar L may be dispensed with as unnecessary. In either case the thills are preferably provided with cross-braces B, coinciding in position with the suspender-springs S and floating bars F for the purpose of reinforcing the thills against the lateral strain to which they are subjected by the suspender-springs S.

Buffers $b$ $b$ may be placed upon the cross-braces B for contact with floating bars F should the latter be unduly depressed.

By my improvements I am enabled to build a lighter structure than has heretofore been possible and one in which frictional contact and wear is reduced to the minimum, in which rattling is obviated, and in which the seat-support is more resilient and safer also, since the loops in the suspending-springs practically protect said springs against breakage and against any strain which they could be subjected to under ordinary conditions of use.

While I have herein shown and described the outer ends of the suspender-springs as attached directly to the thills, as in the first ten figures of the drawings, it is obvious that such springs may be in like manner supported upon other rigid portions of the vehicle, if desired. Where the suspender-springs are attached directly to the thills and the latter reinforced by a cross-brace B, said cross-brace is depressed centrally to the same level, or substantially the same level, as the depressed portion $t^2$ of the upper bridge-bar of the truss, so as to allow the floating seat-bar F free play; but the cross-brace B may be dispensed with by attaching the springs to the thills where the latter join and cross the truss, as shown in Figs. 11 and 12, or directly to the truss beyond the thills, as shown in Figs. 13 and 14. In either case it will be seen that the springs and floating seat-bar F are in line or in substantially the same plane as that of the truss, which affords direct support for said springs and floating seat-bar, and thus renders a cross-brace B unnecessary.

What I claim as my invention, and desire to secure by Letters Patent, is—

1. In a vehicle of the character designated, a floating seat and seat-bar supported by suspender-springs secured to and between the thills, for the purpose described, each suspender-spring being formed with a loop adjacent to the floating seat-bar, and with a loop adjacent to the thill to which it is attached.

2. In a vehicle of the character designated, a floating seat supported upon suspender-springs secured to and between the thills, said suspender-springs being each formed of wire with a loop adjacent to the seat and with a loop adjacent to the thill to which it is attached for the purpose described.

3. In a vehicle of the character designated, a floating seat supported upon suspender-springs secured to and between the thills, each suspender-spring being formed of wire with a loop adjacent to the seat and with a loop adjacent to the thill to which it is attached, and a wheel-truss formed with an upper bridge-bar the central portion of which is depressed to accommodate the floating seat, for the purpose described.

4. In a vehicle of the character designated, a floating seat supported upon suspender-springs secured to and between the thills, each suspender-spring being formed of wire with a loop adjacent to the seat and with a loop adjacent to the thill to which it is attached, and a wheel-truss formed with an upper bridge-bar the central portion of which is depressed below the peripheral line of the wheels to accommodate the floating seat, for the purpose described.

5. In a vehicle of the character designated, a floating seat supported upon suspender-springs secured at their outer ends to rigid parts of the vehicle-frame, each suspender-spring being formed of wire with a loop adjacent to the seat and a loop adjacent to the rigid part of the vehicle-frame to which it is attached, for the purpose described.

6. In a vehicle of the character designated, a floating seat supported upon suspender-springs secured at their outer ends to rigid parts of the vehicle-frame, each suspender-spring being formed of wire with a loop adjacent to the seat and a loop adjacent to the rigid part of the frame to which it is attached, the loops being formed on opposite sides of the main portion of the spring, with their planes substantially parallel thereto for the purpose described.

7. In a vehicle of the character designated, a floating seat and seat-bar supported by suspender-springs secured at their outer ends to rigid parts of the vehicle-frame, each suspender-spring consisting of a length of wire formed with two loops, said loops extending on opposite sides of the main body of the spring with their planes substantially parallel thereto for the purpose described.

8. In a vehicle of the character designated, a floating seat and seat-bar supported by suspender-springs secured to and between the thills, and a cross-brace secured to and extending between the thills parallel with and in proximity to the suspender-springs and floating seat-bar, for the purpose described.

9. In a vehicle of the character designated, a floating seat and seat-bar supported by suspender-springs secured to and between the thills, and a cross-brace secured to and extending between the thills parallel with and in proximity to the suspender-springs and floating seat-bar, said cross-brace being depressed centrally, to accommodate the floating seat-bar for the purpose described.

10. In a vehicle of the character designated, a floating seat and seat-bar supported by suspender-springs secured to and between the thills, a cross-brace secured to and extending between the thills parallel with and in proximity to the suspender-springs and floating seat-bar, said cross-brace being depressed centrally and a wheel-truss formed with an upper bridge-bar the central portion of which is also depressed, for the purpose of accommodating the floating seat-bar and seat for the purpose described.

11. In a vehicle of the character designated, a wheel-truss formed with an upper bridge-bar the central portion of which is depressed below the peripheral line of the wheels, a floating seat and seat-bar supported by suspender-springs secured to and between the thills, and a cross-brace secured to and extending between the thills parallel with and in proximity to the suspender-springs and floating seat-bar, said cross-brace being depressed centrally to substantially the same level as the central portion of the upper bridge-bar of the truss, for the purpose described.

12. In a vehicle of the character designated, a floating seat supported upon suspender-springs secured to and between the thills, each suspender-spring being formed of wire with a loop adjacent to the floating seat and with a loop adjacent to the thill to which it is attached, and a cross-brace secured to and extending between the thills parallel with and in proximity to the said suspender-springs and floating seat, for the purpose described.

13. In a vehicle of the character designated, a floating seat supported upon suspender-springs secured to and between the thills each suspender-spring being formed of wire with a loop adjacent to the floating seat and with a loop adjacent to the thill to which it is attached, and a cross-brace secured to and extending between the thills parallel with and in proximity to the said suspender-springs and floating seat, said cross-bar being depressed centrally, to accommodate the floating seat for the purpose described.

14. In a vehicle of the character designated, a floating seat supported upon suspender-springs secured to and between the thills, each suspender-spring being formed of wire with a loop adjacent to the floating seat and with a loop adjacent to the thill to which it is attached, a cross-brace secured to and extending between the thills parallel with and in proximity to the said suspender-springs and floating seat, said cross-brace being depressed centrally and a wheel-truss formed with an upper bridge-bar the central portion of which is also depressed to accommodate the floating seat for the purpose described.

15. In a vehicle of the character designated, a wheel-truss formed with an upper bridge-bar the central portion of which is depressed below the peripheral line of the wheels, a floating seat suspended upon springs secured to and between thills, each suspender-spring being formed of wire with a loop adjacent to the floating seat and with a loop adjacent to the thill to which it is attached, and a cross-brace secured to and extending between the thills parallel with and in proximity to the suspender-springs and floating seat, said cross-brace being depressed centrally to substantially the same level as the central portion of the upper bridge-bar of the truss for the purpose described.

16. In a vehicle of the character designated, a floating seat supported by suspender-springs secured at their outer ends to rigid parts of the vehicle-frame, each suspender-spring consisting of a length of wire formed with two loops, said loops extending on opposite sides of the main body of the spring with their planes substantially parallel thereto for the purpose described.

17. In a vehicle of the character designated, a floating seat supported upon suspender-springs secured at their outer ends to rigid parts of the vehicle-frame, each suspender-spring consisting of a wire formed with two loops interposed, at different points in its length, between the said floating seat and the said rigid support on the vehicle-frame for the purpose described.

HENRY J. MILLER.

Witnesses:
D. W. GARDNER,
GEO. WM. MIATT.